US005109938A

United States Patent [19]

Vautelin et al.

[11] Patent Number: 5,109,938

[45] Date of Patent: May 5, 1992

[54] MOTORIZED GOLF CART

[75] Inventors: Francis Vautelin; Robert Perrier, both of Beaune, France

[73] Assignee: Groupement d'Interet Economique Golf Inov, Beaune, France

[21] Appl. No.: 600,186

[22] Filed: Oct. 17, 1990

[30] Foreign Application Priority Data

Oct. 23, 1989 [FR] France ................................ 89 13821

[51] Int. Cl.[5] ............................................ B62D 51/04

[52] U.S. Cl. .................................. 180/19.3; 280/645; 280/DIG. 5; 280/DIG. 6; 280/422; 403/100

[58] Field of Search ................ 280/40, 641, 645, 652, 280/655, DIG. 6, 63, 38, DIG. 5; 180/65.1, 65.6, 19.1, 19.3, 422; 403/100, 101

[56] References Cited

U.S. PATENT DOCUMENTS

| | | | |
|---|---|---|---|
| 1,714,698 | 5/1929 | Stoll | 403/100 |
| 2,029,484 | 2/1936 | Howard et al. | 403/100 |
| 3,167,146 | 1/1965 | Rudolph | 180/19.1 |
| 3,907,056 | 9/1975 | Thomas | 280/DIG. 5 |
| 3,952,821 | 4/1976 | Craven | 180/19.1 |

FOREIGN PATENT DOCUMENTS

| | | | |
|---|---|---|---|
| 2634765 | 2/1978 | Fed. Rep. of Germany | 280/DIG. 5 |
| 2621251 | 4/1989 | France . | |

*Primary Examiner*—Charles A. Marmor
*Assistant Examiner*—Kevin Hurley
*Attorney, Agent, or Firm*—Amster, Rothstein & Ebenstein

[57] ABSTRACT

The motorized trolley-type golf cart of the invention comprises a chassis made up from at least two supports assembled to each other by a swivel type connection device constituted by a male portion and a female portion which are engaged in each other and which are fixed to respective ones of the two supports of the chassis. One of the supports carries two drive wheels, an electric motor, and a battery, while the other support is essentially constituted by a tiller bar which is foldable and terminated at one end by a grip having a manual control member which is connected to the motor by an electrical connection which includes an intermediate connector whose two halves are fixed to respective ones of the portions of the connection device.

18 Claims, 4 Drawing Sheets

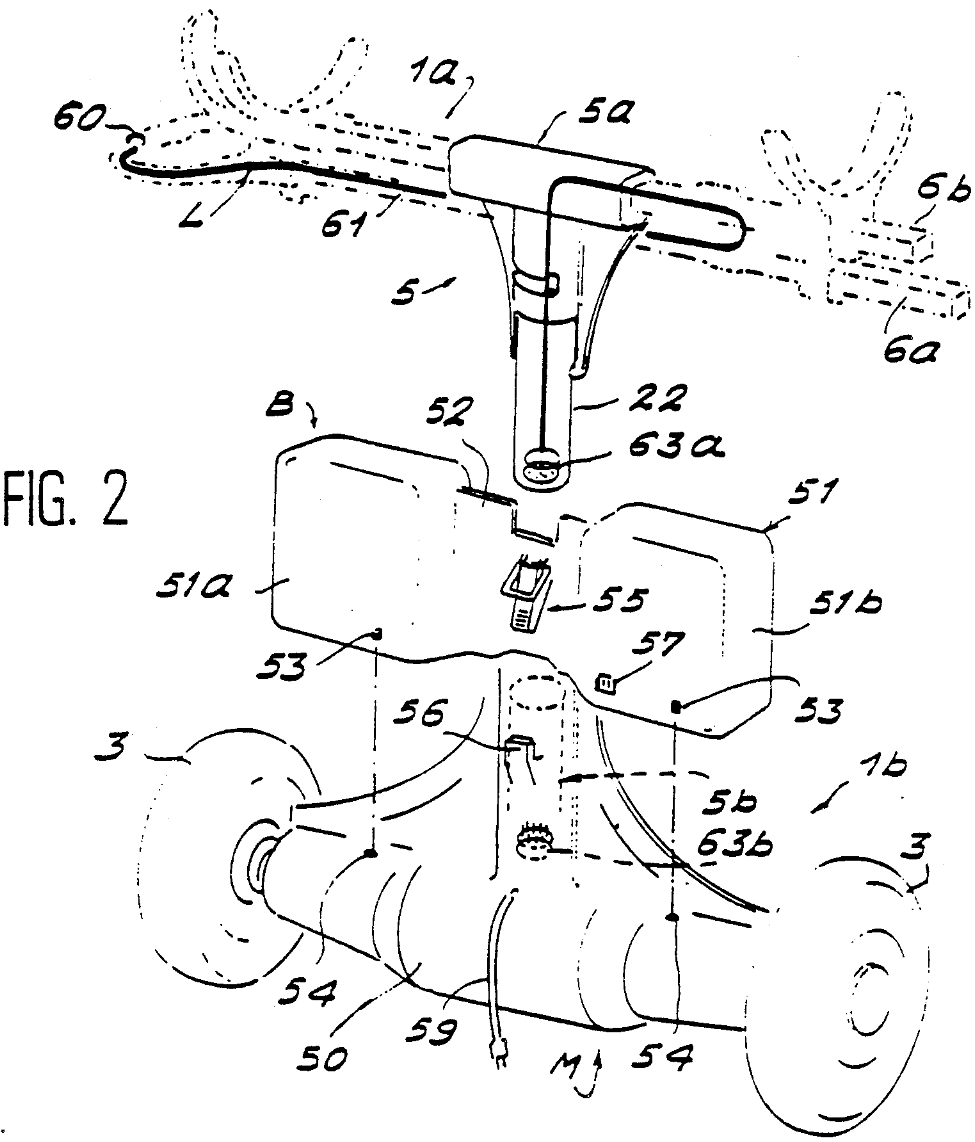
FIG. 2
FIG. 3
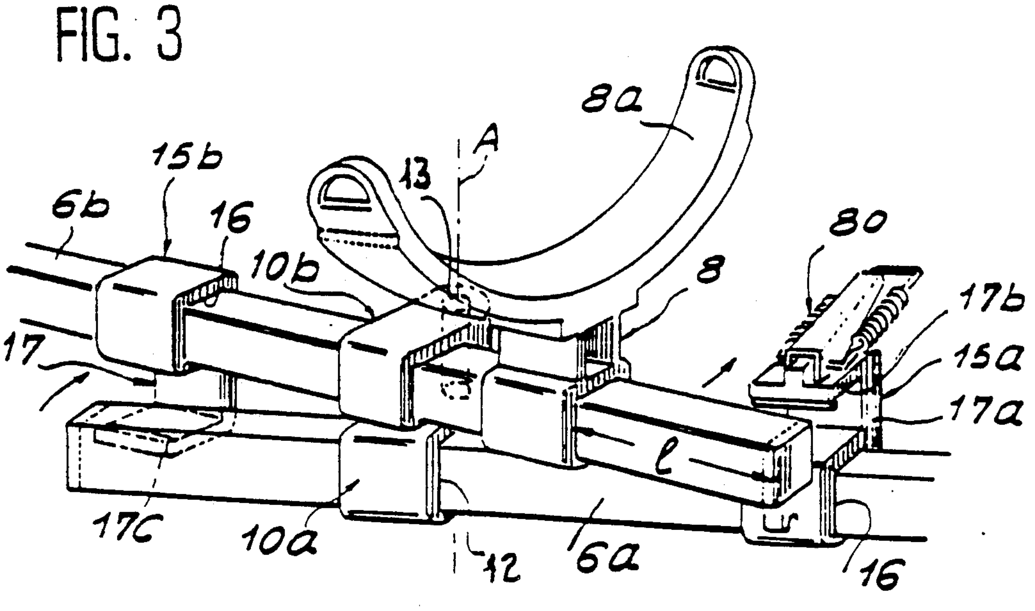

MOTORIZED GOLF CART

FIELD OF THE INVENTION

The present invention relates to a motorized golf cart of the trolley type comprising a chassis made up of at least two supports assembled to each other by means of a swivel type connection device constituted by interfitting male and female portions fixed to respective ones of the two chassis supports, one of the supports carrying two drive wheels, an electric motor, and a battery, the other support being essentially constituted by a tiller bar terminated at one end by a grip having a manual control member which is connected to the motor by an electrical connection including an intermediate connector.

BACKGROUND OF THE INVENTION

In general, the chassis of a golf cart, whether motorized or not, is of the foldable or dismountable type so as to reduce its size considerably, thereby facilitating transport in the boot of a car, for example.

For a cart which is motorized and has a dismountable chassis, it is necessary to have an intermediate connector in the electrical connection between the motor which is carried by a first support of the chassis and its control member which is carried by the tiller bar constituted by a second support of the chassis and which is removably fixed to the first support. This electrical connection with an intermediate connector is generally constituted by a flexible electrical cable passing outside the chassis.

The object of the invention is to design a motorized golf cart having an electrical connection of a novel type between the motor and its control member, said connection being particularly adapted to a chassis such as that described in patent document FR-2 621 251 in the name of the Applicant.

The chassis described in the above-mentioned document is advantageously constituted by two supports which are assembled to each other by a connection device of the swivel type comprising two portions, namely a male portion and a female portion which interfit in one another and which are fixed to respective ones of the two supports of the chassis. The chassis is such that its two supports are capable of taking up two positions relative to each other while remaining connected together. In a first or "in-use" position, the two supports are substantially at 90° to each other (the tiller bar lying in a plane which is perpendicular to the axis of the wheels and which is halfway between them), and in the second or "storage" position, the two supports are generally coplanar (the tiller bar lying substantially parallel to the axis of the wheels).

SUMMARY OF THE INVENTION

According to the invention, the male and female halves of the intermediate connector are respectively supported by the male portion and by the female portion of the connection device and lie on the swivel axis of the two supports of the chassis.

Given that the swivel motion between the two chassis supports of the above-mentioned type for changing the cart from its in-use position to its storage position, or vice versa, is preceded by relative displacement of the two supports in translation along their axis of rotation or the purpose of unlocking them from each other, it is during this axial displacement in one direction (unlocking the two supports) or in the opposite direction (locking the two supports) that the male and female halves of the auxiliary connector are automatically separated or engaged.

When the cart is in its in-use position or in its storage position with the two supports of the chassis held stationary relative to each other, the male and female halves of the auxiliary connector are engaged in each other, and it could be supposed that while in either of these positions the connector provides electrical continuity for the connection containing it. Under such conditions, the motor could be caused to rotate whenever the control member situated on the grip is not in its stop position. Nevertheless, when the cart is in its storage position and in spite of the male and female connector halves of the connector being engaged in one another, continuity of the connection is nevertheless interrupted at the connector. To do this, the cylindrically shaped connector is chosen, for example, to have a number of contacts which is larger than the number required for providing continuity in the electrical connection, so that the above-mentioned conditions are satisfied by an appropriate selection of those ones of the male and female contacts which are actually used.

According to another disposition of the invention, the motor is housed in a box onto which another box is removably fixed for housing the battery, there being an external electrical connection which provides the connection between the battery and an electronic circuit for varying the speed of the motor, said external connection being connected to the battery by means of a connector which is supported by the battery box and which also serves for connecting the battery to an external power supply for recharging purposes.

According to another disposition of the invention, the tiller bar comprises two half-bars hinged to each other about an eccentric pivot pin, and it includes means for limiting the pivoting motion of the two half-bars to between two extreme positions corresponding respectively to the bar being folded or being unfolded, together with means for locking the two half-bars into the unfolded position of the bar.

According to another disposition of the invention, the cart is pushed or pulled depending on the direction in which the tiller bar is mounted.

By virtue of these various dispositions, changing the cart from its storage position to its in-use position, or vice versa, does not require any manual action to be taken on the intermediate connector interposed on the electrical connection between the motor and its control member situated on the grip of the tiller bar.

BRIEF DESCRIPTION OF THE DRAWINGS

An embodiment of the invention is described by way of example with reference to the accompanying drawings, in which:

FIG. 2 is an exploded perspective view of the golf cart shown in FIG. 1;

FIG. 3 is a fragmentary perspective view showing how the two half-bars forming the tiller bar of the golf cart are assembled together;

FIG. 7, 7a, and 8, 8a are theoretical diagrams showing the golf cart being pulled or pushed depending on the direction in which its tiller bar is mounted.

DETAILED DESCRIPTION

Figure 1:
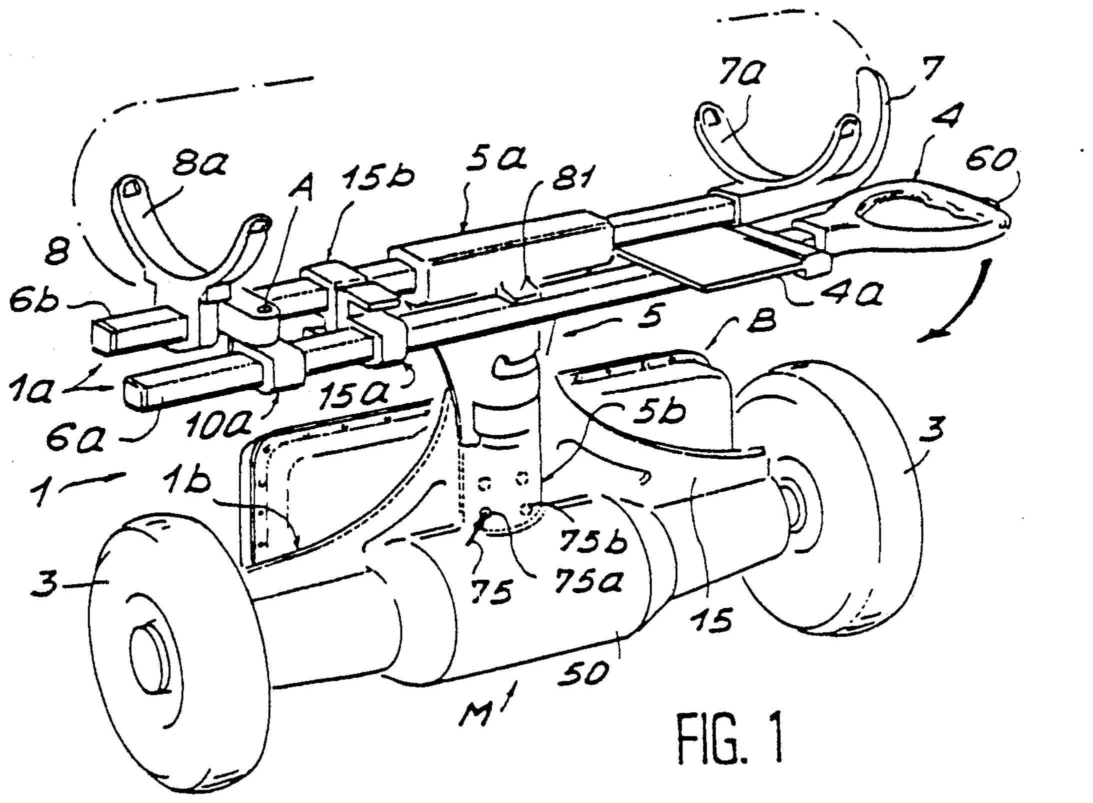
FIG. 1 is a perspective view of a motorized golf cart of the invention and shown in its storage position.

With reference to FIGS. 1 and 2, the motorized golf cart of the invention comprises a chassis 1 which serves essentially to support a removable golf bag (not shown), two drive wheels 3, an electric motor M, a self-contained power supply such as a battery B, and a guiding and maneuvering grip 4 having a manual control member 60 connected by an electrical connection L to an electronic circuit 58 for varying the speed of the motor M.

The chassis 1 comprises two supports 1a and b which are swivel mounted relative to each other by means of a swivel type connection device 5.

The support 1a comprises two half-bars 6a and 6b which are of substantially the same length and which together constitute the tiller bar of the cart. In the example shown, each half-bar 6a, 6b is constituted by a rectangular section metal rod, e.g. made of aluminum.

With reference more particularly to FIG. 3, the two half-bars 6a and 6b are hinged to each other about a pivot pin respective ones of the two half-bars 6a and 6b. Each block 10a and 10b is advantageously made of plastic and has an opening 12 of rectangular section passing through it so as to enable the block to be slidably mounted on the associated half-bar 6a, 6b. Each block 10a, 10b also has a hole 13 passing through it along an axis parpendicular to the axis of the associated opening 12. The blocks 10a and 10b are mounted towards one of the ends of the associated bars 6a and 6b at a distance l from said end.

The pivot pin A is freely received in one of the two holes 13 in the two blocks 10a and 10b, and is held in position by any appropriate means. With this assembly, the pin A lies off the axes of the two half-bars 6a and 6b and extends perpendicularly thereto. Assuming that one of the half-bars is stationary, then the other half-bar is free to pivot through 180° between two extreme positions corresponding respectively to a folded position and to an unfolded position of the tiller bar. To this end, each half-bar 6a, 6b supports a second block 15a, 15b which is advantageously made of plastics material and which performs two functions: a function of limiting pivoting; and a function of locking the two half-bars 6a and 6b in the unfolded position.

Each second block 15a, 15b has an opening 16 of rectangular section passing through it so as to enable the block to be slidably mounted on the corresponding half-bar 6a, 6b. Each block 15a, 15b also has a U-shaped housing 17 comprising a base 17a formed by an extension of one of the faces of the block, a first branch formed by the outside face of the block which is perpendicular to the base 17a, and a second branch 17b formed by a parallel wall facing said face of the block. In addition, the free end surface of the wall 17b has an inwardly directed lip 17c. Each housing 17 is substantially the same size as the cross-section of the half-bars 6a, 6b.

Each second block 15a, 15b is mounted on the associated half-bar 6a, 6b in such a manner that its housing 17 is capable of receiving the end portion of the other half-bar (adjacent to the pivot pin A).

Referring once more to FIG. 1, half-bar 6a supports a grip 4 at its end furthest from the pivot pin A (FIG. 1). This grip 4 is advantageously made of plastics material and has a tubular end fitting that is a force-fit on the end of the half-bar 6a. A manual control member 60 such as a rotary type potentiometer and switch is mounted on the grip. A plate 4a extends the grip 4 along the axis of half-bar 6a and is intended to support a score card, golf-tees, and golf balls, and it may optionally include a small storage box.

The end of half-bar 6b furthest from the pivot pin A receives a tubular end fitting 7 made of plastics material and forming a third support point for the carriage (with the other two support points being constituted by its wheels 3). This end fitting 7 carries a first cradle 7a for supporting a golf bag which is held in place by straps, for example (not shown). Near its other end, half-bar 6b supports a second cradle 8a whose base 8 has a through opening enabling it to slide on the half-bar 6b close to its end adjacent to the pivot pin A.

The support 1b of the chassis is an elongate plane component 15 which supports the two wheels 3 at its two ends.

The swivel connection device 5 between the two supports 1a and 1b of the chassis is constituted as described in the above-mentioned document and it comprises a male portion 5a and a female portion 5b both made of plastics material, said portions interfitting in each other and being fixed to respective ones of the two supports 1a and 1b.

Figure 4:
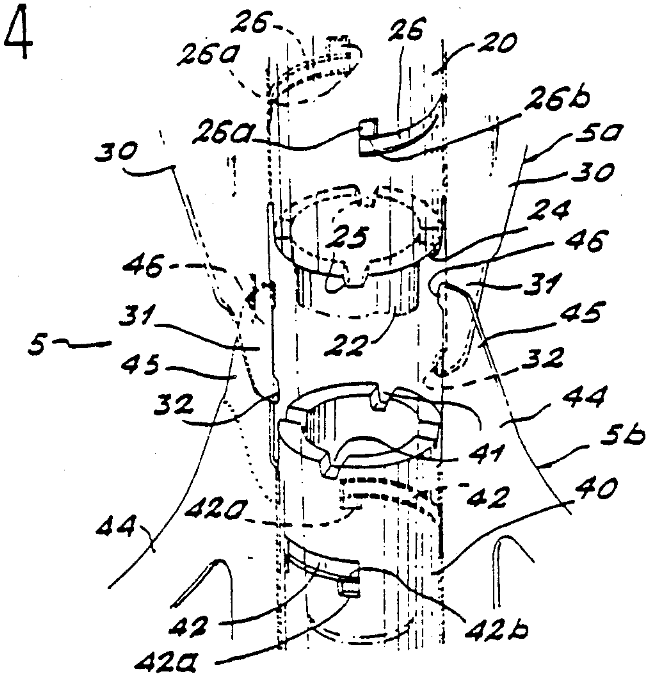
FIG. 4 is a fragmentary perspective view showing the swivel type connection device between the two supports of the chassis.
Figure 5:
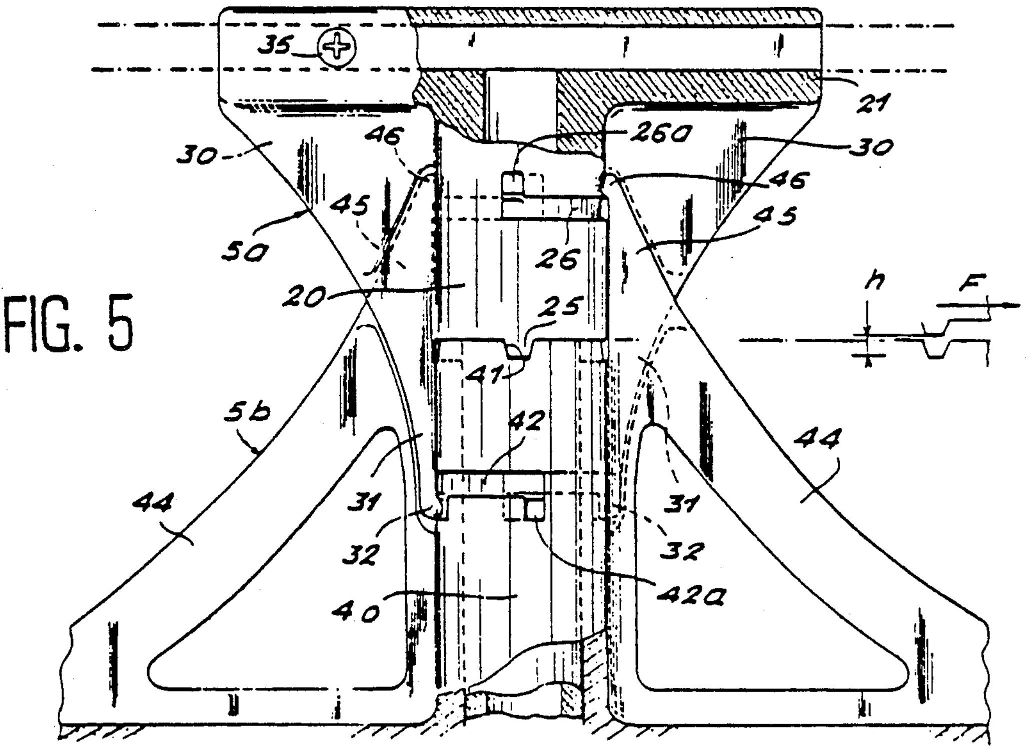
FIG. 5 is a partially cut-away view of the connection device between the two supports of the chassis in the storage position of the golf cart.

With reference to FIGS. 4 and 5, the male portion 5a, which is generally T-shaped has a central tubular part 20 of circular section which is connected at one end to a transverse tubular part 21 extending perpendicularly and projecting on either side from the central tubular part 20. The central part 20 extends axially at its other end in the form of a smaller diameter circular section tube 22. The central tubular part 20 and the tube 22 together delimit an annular outside shoulder 34 with four axial projections 25 projecting from the surface thereof forming regularly spaced apart circumferential abutments. The outer peripheral surface of the central tubular part 20 has two diametrically opposite coplanar grooves 26 which extend over two respective angular sectors of about 90° each. The outer peripheral surface of the central tubular part 20 has a notch 26a towards each end of each of the grooves 26 and at a different level from the grooves 26. Each notch 26a is separated from the corresponding groove 26 by a rib 26b. Finally, the male portion 5a is completed by two stiffener webs 30 which extend the transverse tubular part 21 on either side of the central tubular part 20 and which are connected thereto. These stiffener webs 30 extend over the length of the central tubular part 20, and each of them is extended by a lug 31 which extends over a portion of the length of the tube 22 and which is terminated by a radially inwardly directed peg 32. The two stiffener webs 30 and the lugs 31 lie in a plane including two diametrically opposite ends of the two grooves 26 and two diametrically opposite abutments 25 on the central tubular part 20. The male portion 5a is engaged at one end on the half-bar 6b of the tiller bar by means of its transverse tubular part 21 and it is then fixed in position along the half-bar 6b by means of a screw 35, for example.

The female portion 5*b* is constituted by a tubular part 40 which is integral with the part 15 constituting the second support 2*b* of the chassis 1. This tubular part 40 is situated at the center of the part 15, it extends perpendicularly therefrom and it is circular in section having an inside diameter which is slightly greater than the outside diameter of the tube 22 of the male portion 5*a*, and having an outside diameter which is substantially equal to the outside diameter of the central tubular part 20 of the male portion 5*a*. At its free end surface, the tubular part 40 has four notches 41 which are regularly spaced apart from one another around the circumference. In a manner similar to the central tubular part of the male portion 5*a*, the outside peripheral surface of the tubular part 40 has two diametrically opposite coplanar grooves 42 each extending over an angular sector of about 90°, and four notches 42*a* each of which is close to one of the ends of a respective one of the grooves 42, but is situated at a level different from the level of the corresponding groove 42 and is separated therefrom by a rib 42*b*. The structure of the female portion 5*b* is likewise completed by two diametrically opposite stiffener webs 44 each connected to the part 15 constituting the second support 1*b* and to the tubular part 40. Each stiffener web 44 extends beyond the free end surface of the tubular part 40 in the form of a lug 45 terminated by a radially inwardly directed peg 46.

Figure 6:
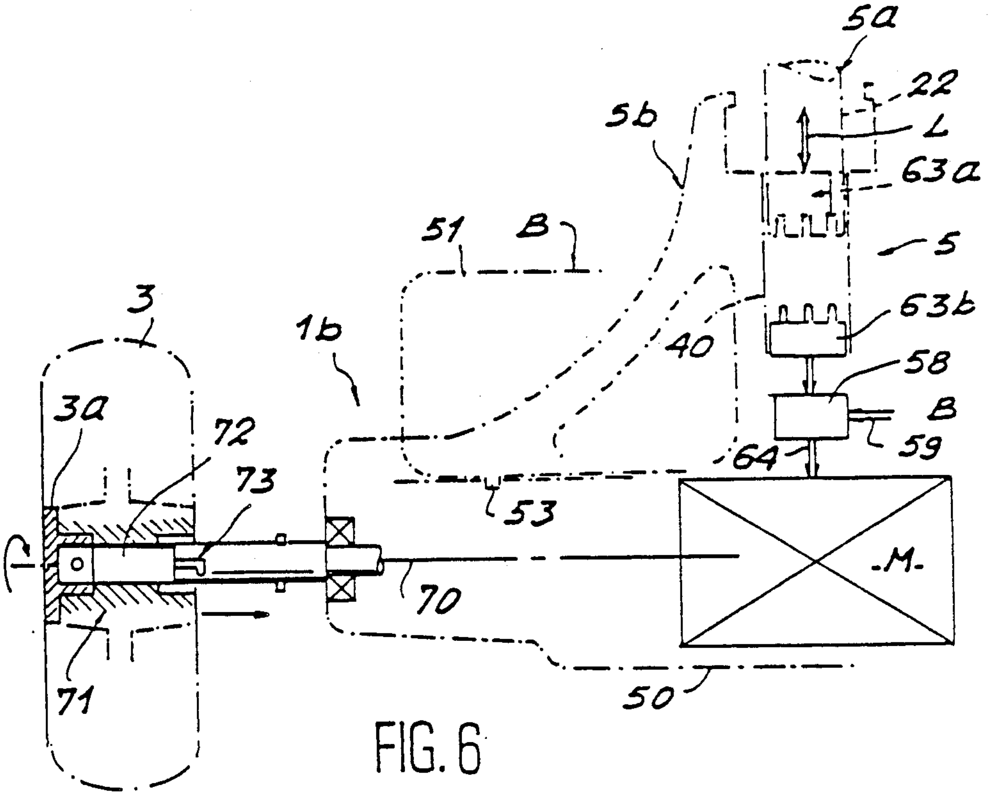
FIG. 6 is a fragmentary diagrammatic view showing the system for driving the wheels of the golf cart.

With reference more particularly to FIGS. 1, 2, and 6, the motor M is received in an elongate box 50 constituted by two half-boxes made of plastics material and assembled to each other by means of screws, for example. The box 50 is disposed around the support 1*b* of the chassis 1.

The battery B is also housed in a box 51 made up of two half-boxes of plastics material which are assembled together by means of screws, for example. The box 51 is split into two compartments 51*a* and 51*b* containing battery components and interconnected by a central portion 52 of lesser thickness.

The box 51 rests on the box 50 and is positioned thereon by means of pegs 53 which penetrate into two respective holes 54 of the box 50.

In this position, the central portion 52 of the box 51 bears against the tubular part 40 of the female portion 5*b* of the connection device 5. In order to hold the battery B in position, a locking member 55 such as a toggle-action hook is provided on the central portion 52 of the box 51 and it cooperates with an abutment 56 provided on the outside surface of the tubular part 40 of the female portion 5*b* of the connection device 5.

A connector 57 is provided in compartment 51*b* of the box 51 housing the battery B for the purposes firstly of powering the electronic circuit 58 for varying the speed of the motor M by means of an outside electric cable 59 connected to the battery B, and secondly as a connection point for recharging the battery components B from an external power supply.

The manual control member 60 of the motor M situated on the grip 4 is connected by means of a connection L such as an electric cable 61 which passes inside half-bar 6*a*, passes along a portion of half-bar 6*b* to penetrate into the inside of the central tubular part 20 and its extension 22 constituting the male portion 5*a* of the connection device 5. The free end of the cable 61 is connected to the male half 63*a* of an intermediate connector mounted at the end of the tube 22. The female half 63*b* of this connector is mounted at the bottom of the tubular part 40 of the female portion 5*b* of the connection device 5. This female connector half 63*b* is connected by an electric cable 64 to the circuit 58 as shown diagrammatically in FIG. 6. The intermediate connector 63*a*, 63*b* is cylindrical in shape having its male and female contacts distributed around two circles of the same diameter. When the male and female halves 63*a* and 63*b* of the connector are engaged in one another, the connector does not necessarily provide electrical continuity for the link L, depending on whether the cart is in its in-use position or its storage position. Continuity is provided only when the cart is in its in-use position. For example, by selecting a connector such that the number of male and female contacts required for providing electrical continuity in the electrical connection L is less than the number of male and female contacts available, it suffices to select contacts appropriately in order to satisfy the above-mentioned conditions.

The electronic circuit 58 for varying the speed of rotation of the motor M as powered by the battery B and as controlled by the control member 60 on the grip 4 determines the speed of rotation of the motor M and also includes components for providing thermal protection against the motor M overheating and for limitinq battery consumption.

With reference still to FIG. 6, the motor M is coupled to a stepdown gear box unit (not shown) which rotates an axle 70 having the two drive wheels 3 mounted on opposite ends thereof via conventional freewheel bearing mechanisms 71. Using such bearing mechanisms, the wheels 3 are free to rotate when the cart is pushed or pulled manually without assistance from the motor M, and they are driven in a given direction of rotation when the motor M is switched on.

Each of the wheels 3 is removably mounted on the corresponding end of the axle 70 and has a hubcap 3*a* mounted to rotate between two positions which are one-fourth of a turn apart. Each hubcap 3*a* is fixed to a tubular part 52 in which the associated end of the axle 70 is engaged, with coupling means shown diagrammatically at 73 controlled by rotating the hubcap 3*a* such that in one of the two positions of the hubcap a the wheel 3 is coupled to the axle 70, while in its other position it is released therefrom.

Assume that the cart is as shown in FIG. 1, i.e. in its storage position. The two supports 1*a* and *b* of the cart are prevented from moving either axially or in rotation. In other words, with reference to FIGS. 3 and 4, the pegs 32 and 46 are positioned in the notches 26*a* and 42*a* and they are retained by the retention ribs 26*b* and 42*b* so as to prevent the supports 1*a* and 1*b* moving axially. In order to reinforce this axial retention between the two supports 1*a* and 1*b*, auxiliary fixing means may be provided such as a pushbutton having a finger 75 (shown diagrammatically in FIG. 1) that passes through a hole 75*a* provided in the tubular part 40 of the female portion 5*b* of the connection device 5 and one of four associated holes 75*b* provided in the tube 22 of the male portion 5*a* of the connection device 5. Four holes 75*b* are necessary in order to allow for all possible storage and in-use positions of the carriage, and because the bar 6*a*, 6*b* may be mounted in two different directions that are at 180° from each other (see FIGS. 7, 7*a*, 8, and 8*a* described below). Finally, the abutments 25 of the male portion 5*a* engage in the notches 41 of the female portion 5*b*, thereby preventing the supports 1*a* and 1*b* from rotating.

In this position, the male and female halves 63*a* and 63*b* of the intermediate connector are engaged in one another, but without enabling the motor M to be switched on, for obvious safety reasons.

In order to put the cart in its in-use position, the two supports 1*a* and 1*b* of the chassis are unlocked by moving the pegs 32 and 46 into the grooves 26 to 42 respectively after unlocking the locking finger 75. To do this, the two supports 1*a* and 1*b* are moved apart from one another by exerting a small amount of traction on one of the supports along the axis of the connection device 5 in order to disengage firstly the abutment 25 from the notches 42 and secondly the pegs 32, 46 from the notches 26*a*, 42*a*, with the pegs moving over the ribs 26*b*, 42*b* so that they move into the grooves 26 and 42. By moving the two supports 1*a* and 1*b* apart in this way, the male and female halves 63*a* and 63*b* of the intermediate connector are separated automatically. Then, the pegs 32 and 46 are brought into abutment against the opposite ends of the grooves 26 to 42 respectively by rotation through substantially 90°. In this intermediate position, the stiffener webs 30 and 45 are at substantially 90° to one another, i.e. the axis of the wheels 3 occupies a plane perpendicular to that of the tiller bar 6. After this rotation, the two supports 1*a* and 1*b* are fixed together again by exerting axial pressure along the axis of the connection device 5 so as to re-engage the pegs 32 and 46 in respective notches 26*a* and 42*a*, thereby providing axial locking, and so as to re-engage the abutments 25 in respective notches 41 so as to provide rotary locking, and also reengaging the male half 63*a* and the female half 63*b* of the connector. In this case electrical continuity is ensured through the connector 63*a*, 63*b*, i.e. the motor M can be switched on.

It then remains to unfold the half-bar 6*a* of the tiller bar 6 by pivoting it about the pin A. With reference to FIG. 3, the end of half-bar 6*a* furthest from the grip 4 is received in the housing 17 of the block 15 supported by half-bar 6*b*, and in symmetrical manner the housing 17 of the block 15 supported by half-bar 6*a* receives the end of half-bar 6*b* furthest from its end carrying the end fitting 7 constituting the third support point of the cart. The housings 17 limit the pivoting motion of the half-bar 6*a* such that the two half-bars 6*a* and 6*b* are substantially in alignment. The lips 17*c* of the housings 17 constitute first means for holding the two half-bars 6*a* and 6*b* in the unfolded position. Second retaining means are advantageously provided such as a toggle-action hook 80 carried by the block 15*a* on half-bar 6*a* and serving to lock the two half-bars 6*a* and 6*b* in position (FIG. 3).

Naturally, in order to go from the in-use position of the cart to its storage position, the same operations are performed but in the opposite order. With reference to FIG. 1, it should be observed that in the folded position of the bar, the two half-bars 6*a* and 6*b* are held against each other by a resiliently deformable U-shaped lug 81 provided on the central tubular part 20 of the male portion 5*a* of the connection device 5, said lug receiving half-bar 6*a*.

Figure 7:
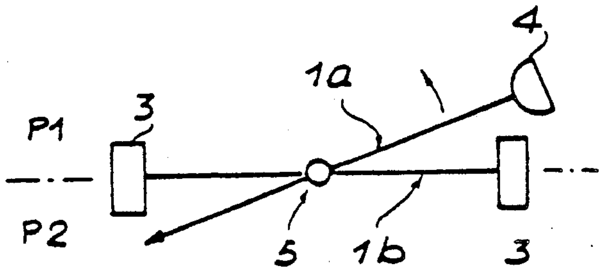

Transforming the cart from its storage position to its in-use position is shown diagrammatically in FIGS. 7 and 7*a*. The motor M can rotate in one direction only, and it is assumed that it drives the cart in the direction of arrow F, i.e. that the cart is a cart for pulling, giving the position of the tiller bar 6.

Figure 8:
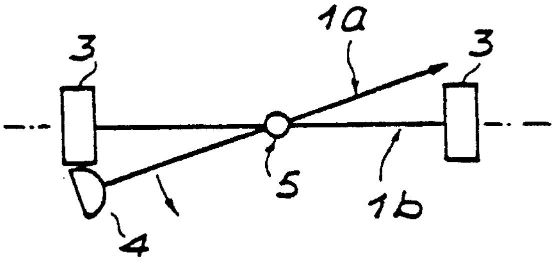
Figure 7:
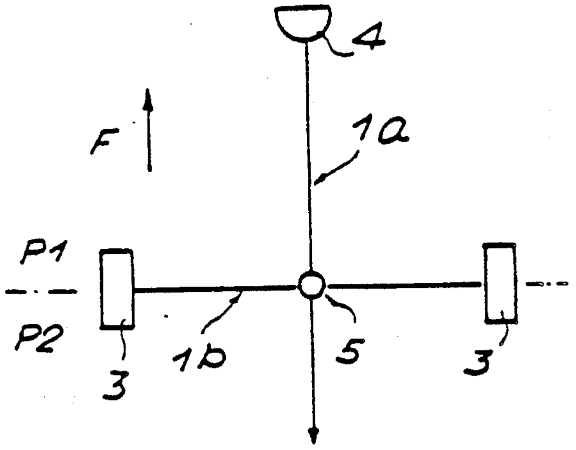
Figure 8:
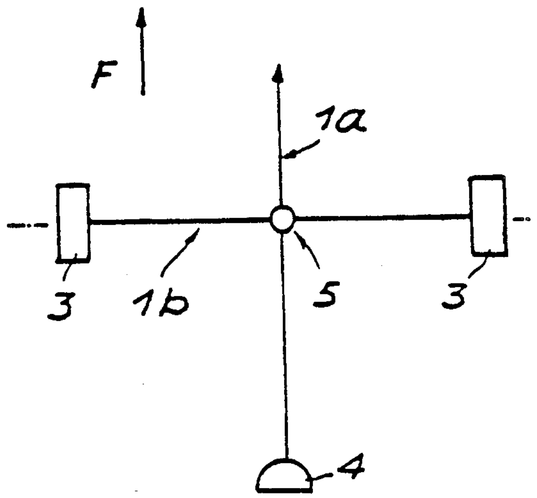

As shown in FIGS. 7 and 7*a*, and assuming that the cart does not move, two half-planes P1 and P2 can be defined on either side of a line containing the axis of the wheel 3. Under these conditions, and assuming that the two supports 1*a* and 1*b* of the cart are disconnected from each other, the support 1*a* may be mounted on the support *b* so that the grip 4 is situated either in half-plane P1 (FIGS. 7, 7*a*) or else in half-plane P2 (FIGS. 8, 8*a*). In other words, the position of the tiller bar 6 relative to the axis of the wheels 3 determines whether the cart operates as a cart for pulling (FIGS. 7, 7*a*) or for pushing (FIGS. 8, 8*a*).

Advantageously, the component parts of the cart, other than the half-bars 6*a* and 6*b* are made of molded plastics material so as to reduce the weight of the cart.

Naturally, the invention is not limited to the embodiment described and given by way of example. In particular, the means for locking the two supports of the chassis both axially and in rotation, and the means for locking the two half-bars of the tiller bar can be modified without going beyond the scope of the invention.

We claim:

1. A motorized golf cart of the trolley type comprising a chassis made up of at least two supports assembled to each other by means of a swivel type connection device constituted by interfitting male and female portions fixed to respective ones of the two chassis supports, the two supports being capable of being moved apart from each other along the axis of rotation of the connection device in order to release them for rotation and in order to enable them to take up an in-use position or a storage position, one of the supports carrying two drive wheels, an electric motor, and a battery, the other support being essentially constituted by a tiller bar terminated at one end by a grip having a manual control member which is connected to the motor by an electrical connection including an intermediate connector, wherein the male and female halves of the intermediate connector are respectively supported by the male portion and by the female portion of the connection device and lie on the swivel axis of the two supports of the chassis.

2. A golf cart according to claim 1, wherein the tiller bar is constituted by two half-bars which are articulated to each other about an eccentric pivot pin supported by two blocks mounted close to respective ends of the two half-bars.

3. A golf cart according to claim 2, wherein each half-bar supports a block for limiting pivoting motion between the two half-bars, each of the blocks including a U-shaped housing in which the end of the other half-bar is engaged.

4. A golf cart according to claim 3, wherein the blocks associated with the half-bars are made of plastics material and are slidably mounted thereon.

5. A golf cart according to claim 3, wherein at least one of the blocks supports a fixing member for fixing the half-bars to each other when the tiller bar is in the unfolded position.

6. A golf cart according to claim 2, wherein a grip made of plastics material is supported at one of the ends of one of the half-bars.

7. A golf cart according to claim 6, wherein one of the half-bars supports two cradles, one of the cradles being supported by an end fitting mounted at one end of said half-bar and constituting a third support point for the cart.

8. A golf cart according to claim 1, wherein the battery is housed in a box removably fixed to a box in which the motor is housed.

9. A golf cart according to claim 8, wherein a fixing member is provided between the battery box and one of the supports of the chassis.

10. A golf cart according to claim 9, wherein the battery box supports a connector connected to the motor by an electrical connection and a circuit for controlling the speed of rotation of said motor.

11. A golf cart according to claim 1, wherein each wheel is removably mounted and possesses a hubcap which is rotatable to unlocking the wheel on the drive axle.

12. A golf cart according to claim 11, wherein each hubcap selectively controls coupling means for coupling the corresponding wheel to the drive axle.

13. A golf cart according to claim 11, wherein each wheel is mounted on the drive axle via a freewheel bearing.

14. A golf cart according to claim 1, wherein the male and female connector halves of the intermediate connector are engaged in one another both in the in-use position and in the storage position of the cart.

15. A motorized golf cart of the trolley type comprising a chassis made up of at least two supports assembled to each other by means of a swivel type connection device constituted by interfitting male and female portions fixed to respective ones of the two chassis supports, the two supports being capable of being moved apart from each other along the axis of rotation of the connection device in order to release them for rotation and in order to enable them to take up an in-use position or a storage position, one of the supports carrying two drive wheels, an electric motor, and a battery, the other of the supports being essentially constituted by a tiller bar terminated at one end by a grip having a manual control member which is connected to the motor by an electrical connection including an intermediate connector having male and female connector halves, said male and female halves being respectively supported by the male portion and by the female portion of the connection device, lying on the swivel axis of the two supports of the chassis, and engaging one another both in the in-use position and in the storage position of the cart, but disengaged from one another while passing between the in-use position and the storage position of the cart.

16. A golf cart according to claim 15, wherein the number of contacts in the intermediate connector is greater than the number of contacts required for ensuring electrical continuity through the connector.

17. A golf cart according to claim 16, wherein electrical continuity is interrupted at the intermediate connector when the cart is in the storage position.

18. A golf cart according to claim 15, wherein the male and female connector halves of the intermediate connector are separated from one another when the two supports of the chassis are moved apart from each other along the axis of rotation of the connection device.

* * * * *